(12) United States Patent
Dickinson et al.

(10) Patent No.: US 8,966,622 B2
(45) Date of Patent: Feb. 24, 2015

(54) TECHNIQUES FOR PROTECTING AGAINST DENIAL OF SERVICE ATTACKS NEAR THE SOURCE

(75) Inventors: Andrew B. Dickinson, Seattle, WA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 33 days.

(21) Appl. No.: 12/981,198

(22) Filed: Dec. 29, 2010

(65) Prior Publication Data

US 2013/0263256 A1 Oct. 3, 2013

(51) Int. Cl.
*G06F 11/00* (2006.01)

(52) U.S. Cl.
USPC ............................................... 726/22; 726/23

(58) Field of Classification Search
CPC ............ H04L 63/1458; H04L 63/1416; H04L 2463/141; H04L 2463/142; H04L 2463/143
USPC .................... 726/22, 23, 1; 713/188; 709/238
See application file for complete search history.

(56) References Cited

U.S. PATENT DOCUMENTS

| | | | |
|---|---|---|---|
| 7,028,179 B2 * | 4/2006 | Anderson et al. ............. | 713/154 |
| 7,188,366 B2 * | 3/2007 | Chen et al. ........................ | 726/23 |
| 7,526,807 B2 * | 4/2009 | Chao et al. ........................ | 726/23 |
| 7,584,507 B1 * | 9/2009 | Nucci ............................... | 726/23 |
| 7,702,806 B2 * | 4/2010 | Gil et al. ........................ | 709/234 |
| 7,743,415 B2 * | 6/2010 | Poletto et al. .................... | 726/23 |
| 7,757,285 B2 * | 7/2010 | Kubota ........................... | 726/23 |
| 7,836,496 B2 * | 11/2010 | Chesla et al. .................... | 726/13 |
| 7,836,498 B2 * | 11/2010 | Poletto et al. .................... | 726/22 |
| 7,882,556 B2 * | 2/2011 | Ahn et al. ........................ | 726/13 |
| 7,889,735 B2 * | 2/2011 | Grosse ........................... | 370/392 |
| 7,921,460 B1 * | 4/2011 | Callon et al. .................... | 726/22 |
| 7,921,462 B2 * | 4/2011 | Rooney et al. ................... | 726/23 |

(Continued)

FOREIGN PATENT DOCUMENTS

| | | |
|---|---|---|
| EP | 1566947 A1 | 8/2005 |
| JP | 2003-283571 | 10/2003 |

(Continued)

OTHER PUBLICATIONS

Akamai Technologies, Inc., "Akamai Edge Tokenization," Akamai Technologies, Inc., [online], 2010 [retrieved on May 29, 2012]. Retrieved from the Internet < URL: http://www.akamai.com/dl/brochures/Product_Brief_Kona_Edge_Tokenization.pdf>.

(Continued)

*Primary Examiner* — Vivek Srivastava
*Assistant Examiner* — Muhammad A Raza
(74) *Attorney, Agent, or Firm* — Kilpatrick Townsend & Stockton LLP

(57) ABSTRACT

Systems and methods protect against denial of service attacks. Remotely originated network traffic addressed to one or more network destinations is routed through one or more locations. One or more of the locations may be geographically proximate to a source of a denial of service attack. One or more denial of service attack mitigation strategies is applied to portions of the network traffic received at the one or more locations. Network traffic not blocked pursuant to the one or more denial of service attack mitigation strategies is dispatched to its intended recipient. Dispatching the unblocked network traffic to its intended recipient may include the use of one or more private channels and/or one or more additional denial of service attack mitigation strategies.

25 Claims, 10 Drawing Sheets

(56) References Cited

U.S. PATENT DOCUMENTS

| | | | |
|---|---|---|---|
| 7,987,493 | B1* | 7/2011 | Reams et al. .................. 726/1 |
| 8,261,355 | B2* | 9/2012 | Rayes et al. .................. 726/25 |
| 8,468,590 | B2* | 6/2013 | Callon et al. .................. 726/13 |
| 8,505,091 | B2* | 8/2013 | Greenlaw .................... 726/22 |
| 8,510,826 | B1* | 8/2013 | Reams et al. .................. 726/22 |
| 2002/0095492 | A1* | 7/2002 | Kaashoek et al. ............ 709/224 |
| 2002/0120853 | A1* | 8/2002 | Tyree .......................... 713/188 |
| 2003/0110288 | A1* | 6/2003 | Ramanujan et al. ......... 709/238 |
| 2004/0148520 | A1 | 7/2004 | Talpade et al. |
| 2005/0180416 | A1 | 8/2005 | Jayawardena et al. |
| 2006/0010389 | A1* | 1/2006 | Rooney et al. ............... 715/736 |
| 2006/0185014 | A1* | 8/2006 | Spatscheck et al. ........... 726/23 |
| 2007/0118896 | A1* | 5/2007 | Soejima et al. .................. 726/22 |
| 2007/0130619 | A1* | 6/2007 | Reams, III ..................... 726/13 |
| 2007/0143841 | A1 | 6/2007 | Kurakami et al. |
| 2007/0153763 | A1* | 7/2007 | Rampolla et al. ............. 370/351 |
| 2009/0013404 | A1* | 1/2009 | Chow et al. .................... 726/22 |
| 2010/0251329 | A1* | 9/2010 | Wei ................................ 726/1 |
| 2011/0099631 | A1* | 4/2011 | Willebeek-LeMair et al. . 726/23 |

FOREIGN PATENT DOCUMENTS

| | | |
|---|---|---|
| JP | 2006-517066 | 7/2006 |
| JP | 2009-219128 | 9/2009 |

OTHER PUBLICATIONS

International Search Report and Written Opinion mailed Apr. 23, 2012 in Application No. PCT/US2011/65876 filed Dec. 19, 2011.

Singapore Patent Application No. 201304320-3, Examination Report mailed Nov. 25, 2013.

"Cisco next-generation security strategy, Part 1, Necessity of self-defending network, Report 1, Cisco next-generation security plan, Overview of 'Self-defending network,'" Nikkei Communications, extra edition, pp. 24 to 29, Nov. 25, 2005.

Japanese Patent Application No. 2013-547534, Official Notice of Rejection, mailed Jun. 3, 2014.

Canadian Application No. 2,820,308, "Office Action", mailed Oct. 7, 2014, 2 pages.

* cited by examiner

TECHNIQUES FOR PROTECTING AGAINST DENIAL OF SERVICE ATTACKS NEAR THE SOURCE

BACKGROUND

Various computing devices are accessible over public communication networks, such as the Internet. While such access provides numerous opportunities to organizations utilizing such networks, it also presents substantial risk. For example, distributed denial-of-service (DDoS) attacks have become a common way of utilizing distributed computing resources, often under unauthorized control, to overload the capacity of organizations' systems. A DDoS attack may, for example, include a collective group of computers, which may be located in various geographic locations, submitting multiple requests to a web or other server (or collection of servers) in order to utilize the server(s) capacity, thereby preventing the server(s) from responding to legitimate requests in a timely manner, if at all. For many organizations, such as organizations utilizing the Internet to interact with and/or otherwise service customers, preventing servers from responding to legitimate requests can cause significant harm to costs, revenue, customer goodwill, and in other ways. Not only is a DDoS victim prevented from servicing customers, but it may also be responsible for costs to Internet service providers (ISPs) for the increased network traffic attributable to DDoS attacks.

In addition, from the perspective of a victim of a DDoS attack, DDoS attacks often originate from one or more remote geographic locations. Because of the distributed nature of DDoS attacks, DDoS attacks often affect entities other than the intended victims. Communications made as part of a DDoS attack may traverse multiple ISPs, telecommunications carriers, and other entities. An ISP of a region where a significant portion of a DDoS attack originates may be required, for instance, to pay for excess traffic attributable to the DDoS attack to pass over other ISP's and/or carrier's networks. In addition, DDoS attacks may strain network resources such, thereby impeding or even halting the ability of various users to utilize the network resources. The affected users may include not only users of resources of the DDoS victim, but other users who may utilize the network resources.

DETAILED DESCRIPTION

Figure 1:
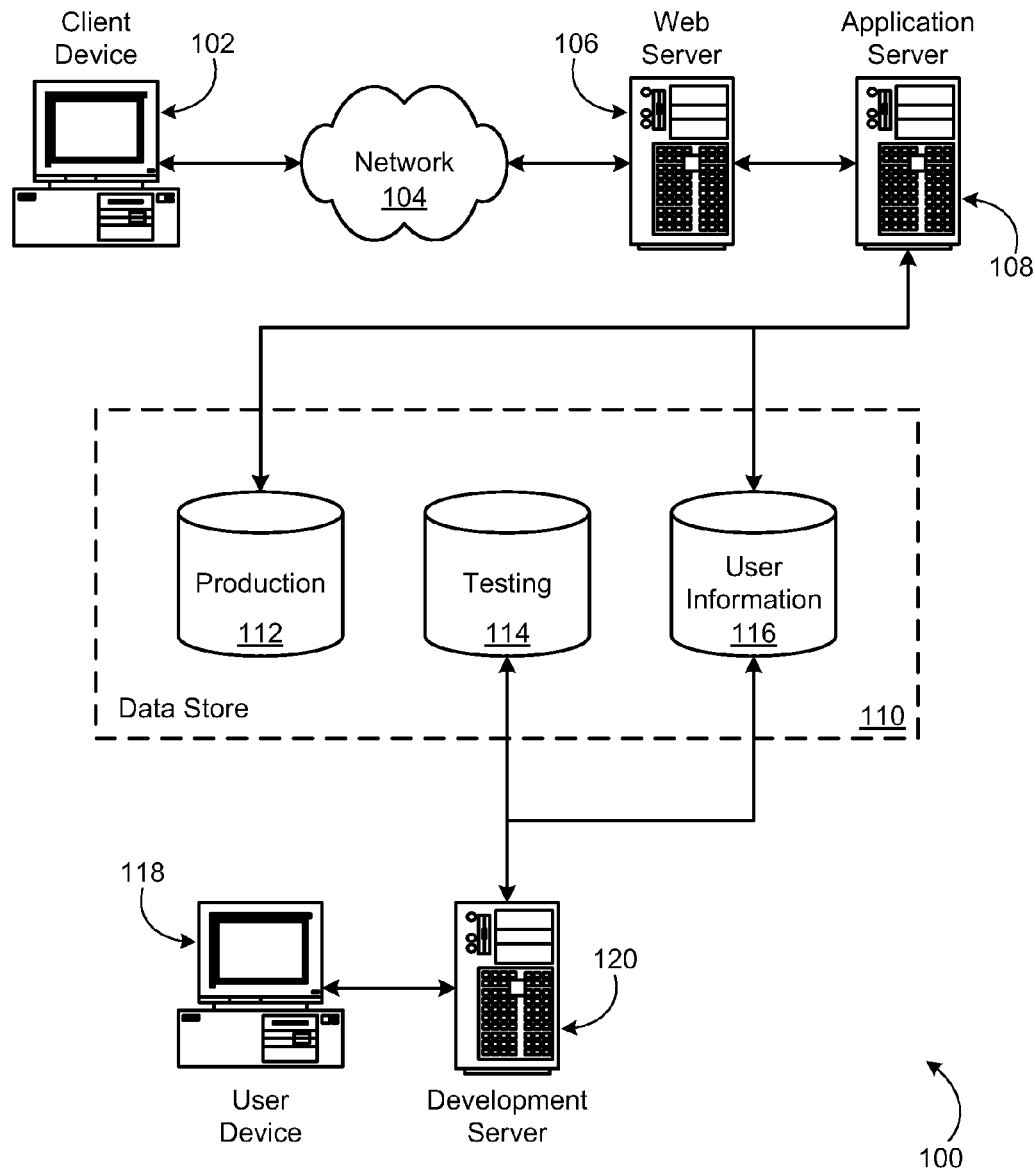
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for mitigating the effects of attempts to adversely affect computer systems, such as through the use of denial of service (DoS) attacks, and/or distributed denial of service (DDoS) attacks. In particular, embodiments of the present disclosure mitigate the effects of DoS attacks by blocking network traffic attributable to a DoS attack at one or more locations that are geographically proximate to geographic regions from which network traffic originates. The one or more locations may, for example, correspond to remotely-deployed network points of presence (POPs). In an embodiment, at least some network traffic directed to one or more network destinations is routed through the one or more locations. Each of the one or more locations may, for example, correspond to network locations in a provider network that is different from one or more provider networks in which the one or more network destinations are located. The one or more network locations may be, for example, in one or more countries that are different from one or more countries of the one or more network destinations. The network destinations may correspond to virtual machine instances operated on behalf of a customer of a remote computing services provider or other physical or virtual computing devices.

The routing of the network traffic may be continuous or may be made at other times. In one embodiment, network traffic flows in one manner, as determined according to conventional routing techniques, until a DoS attack on a network destination is detected. In response to detection of the DoS attack, at least a portion of the network traffic addressed to the network destination may be routed through the one or more remote locations. The network traffic may be routed through one or more remote locations determined to be proximate to a geographic region where a significant amount of the traffic originates or may be through a plurality of remote locations in various geographic regions, where the plurality of remote locations are available for such routing. Routing the network traffic may be done in various ways. In one embodiment, network traffic is performed by announcing border gateway protocol (BGP) routes to the network destinations so that the BGP routes include the one or more remote locations. However, any suitable method for causing at least a portion of network traffic to pass through one or more intended network destinations may be used. For instance, one or more communications to an ISP may be made to request that the ISP route traffic to one or more network destinations through the one or more remote locations. A peering or other agreement with the ISP may be in place to facilitate such routing.

As discussed more below, one or more DoS mitigation strategies may be applied at the one or more remote locations to block illegitimate network traffic while allowing traffic that has not been determined to be illegitimate to proceed toward its destinations. Traffic not identified as illegitimate may be dispatched toward its intended destination in any suitable manner. In an embodiment, network traffic that has not been determined to be illegitimate at the one or more remote locations is dispatched toward its destination using a private channel, such as a virtual private network (VPN), generic routing encapsulation (GRE) tunnel, private backbone, IP security (IPsec) tunnel, and/or dark-fiber network. In an embodiment, the private channel is any suitable private channel configured such that, for network traffic that has passed through the private channel, the original source of the network traffic is determinable and such that the traffic can be identified as having been routed through one or more of the remotely-deployed POPs. For instance, if a packet is received over the private channel by a computing device, in one embodiment, the computing device is able to both determine an IP address of the originator of the packet and whether the packet has passed through a remotely-deployed POP. While in the private channel, additional DoS mitigation strategies may be applied to the traffic to further block network traffic determined to be illegitimate while allowing network traffic not determined to be illegitimate to pass toward its destination.

The techniques described and suggested herein may be applied in a variety of contexts. As mentioned, in one embodiment, the one or more network destinations correspond to one or more virtual machine instances operated by a remote computing services provider. The virtual machine instances may be operated inside of one or more data centers. Accordingly, in an embodiment, network traffic to which one or more DoS mitigation strategies have been applied are received at the one or more data centers and passed to the one or more virtual machines for processing. The one or more data centers, as noted, may apply additional DoS mitigation strategies to the received traffic prior to passing the traffic to its intended recipient. However, embodiments of the present disclosure also apply to other contexts. For instance, embodiments of the present disclosure may be utilized in connection with any potential victim of a DoS attack. A data center, for example, may receive network traffic that has been mitigated according to various techniques described and suggested herein, and dispatch the mitigated traffic from the data center to another location.

Other variations and enhancements are also considered as being within the scope of the present disclosure. For example, victims of DoS attacks often reconfigure their resources to in response to DoS attacks. A victim may, for example, increase the number of servers it uses in order to ensure the availability of enough resources to maintain operations. In addition or as an alternative, victims may change network addresses under attack, perhaps repeatedly if the attack adapts to the new addresses. A victim may, for example, assign new Internet protocol (IP) addresses to its servers so that the DoS attack will, at least temporarily, focus on the old IP addresses. Reassignment may need to be repeatedly done as the attack focuses on the new addresses. In order to maintain protection against DoS attacks, various embodiments of the present disclosure dynamically adapt to such reconfigurations. In an embodiment, such reconfigurations are detected and, in response, updates are made to ensure that traffic directed to a changed set of one or more network addresses is routed through the one or more remote locations. BGP routes, for example, may be updated to ensure that Internet service providers (ISPs) route at least a portion of traffic to the new addresses through the one or more remote locations. Other examples and variations are discussed below.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 118. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
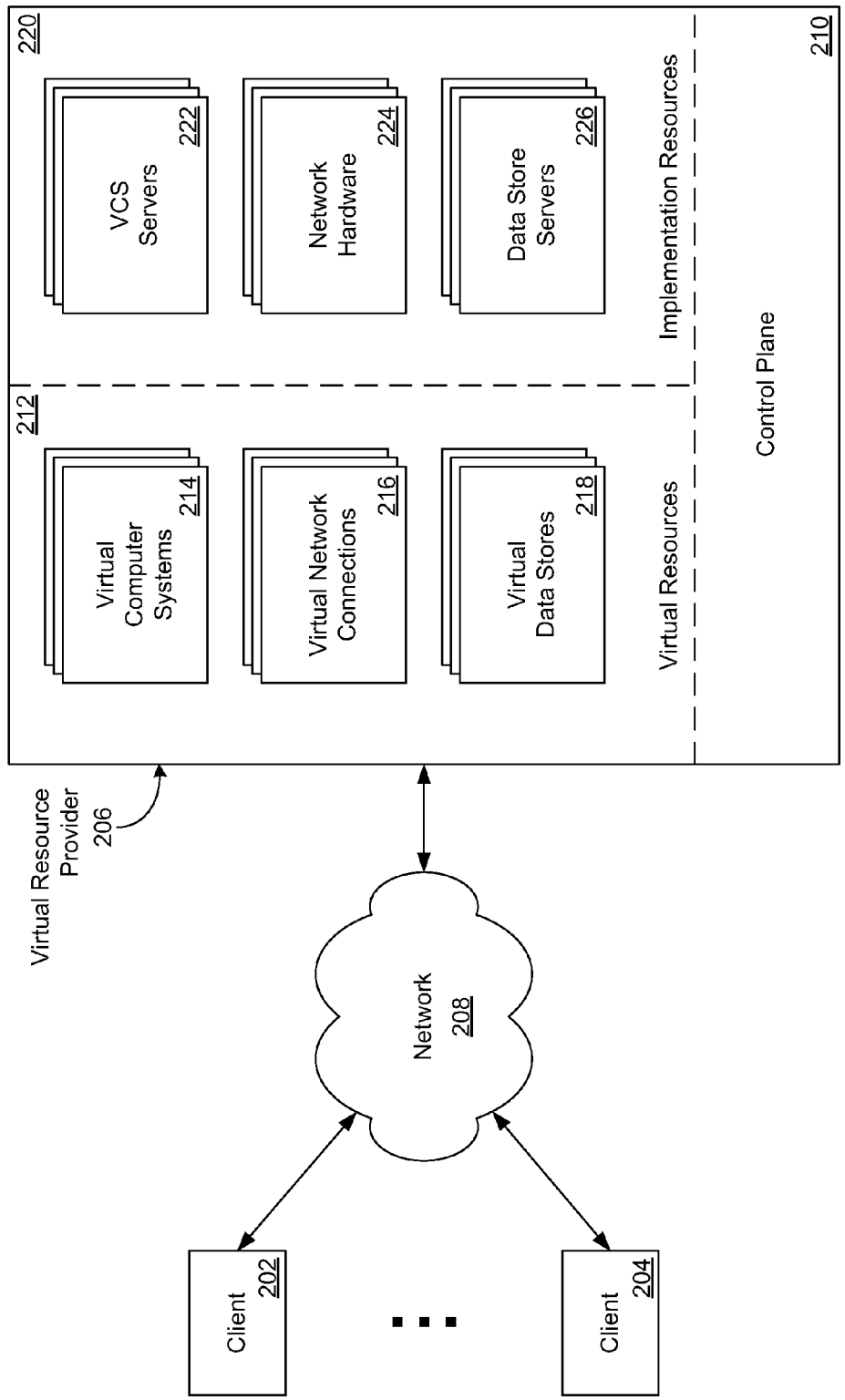
FIG. 2 is a schematic diagram depicting aspects of an example virtual facility provisioning architecture in accordance with at least one embodiment.

In at least one embodiment, one or more aspects of the environment 100 may incorporate and/or be incorporated into a virtual facility provisioning architecture. FIG. 2 depicts aspects of an example virtual facility provisioning architecture 200 in accordance with at least one embodiment. The example virtual facility provisioning architecture 200 includes multiple clients 202-204 communicatively connected to a virtual facility provider 206 over a network 208. For example, the clients 202-204 may corresponding to computing devices such as the computing device 102 of FIG. 1 and/or client programs incorporated into such computing devices. The ellipsis between the client 202 and the client 204 indicates that the virtual facility provisioning architecture 200 may include any suitable number of clients (e.g., thousands, millions, and more) although, for clarity, only two are shown in FIG. 2.

One or more of the clients 202-204 may be utilized by one or more customers of the virtual resource provider 206 to interact with a control plane 210 of the virtual resource provider 206, and thereby provision one or more virtual resources 212. Alternatively, or in addition, one or more of the clients 202-204 may be utilized (not necessarily by virtual resource provider 206 customers) to interact with provisioned virtual resources 212. The provisioned virtual resources 212 may include any suitable virtual resources. Examples of suitable virtual resources 212 include virtual computer systems 214, virtual network connections 216, and virtual data stores 218, as well as virtual resources not shown in FIG. 2 such as specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The virtual resource provider 206 may include any suitable implementation resources 220. Each of the virtual resources 212 may be implemented by a set of the implementation resources 220. In at least one embodiment, various implementation resources of the implementation resources 220 may be configured to participate in implementing, at least in part, multiple virtual resources of the virtual resources 212. Examples of suitable implementation resources 220 include virtual computer system (VCS) servers 222, network hardware 224, and data store servers 226, as well as implementation resources not shown in FIG. 2 and/or those described in more detail below with reference to FIG. 3. The control plane 210 may process virtual facility provisioning requests, manage allocation of virtual resources 212 to implementation resources 220 and/or manage allocation of implementation resources 220 to virtual resources 212, as well as provide for associated cost accounting services.

When a particular implementation resource of the implementation resources 220 participates in the implementation of multiple virtual resources of the virtual resources 212, the implementation resource may become contended, for example, the implementation resource may receive sufficient service requests from the multiple virtual facilities resources that request servicing time increases. Contended implementation resources can be a source of unintended and/or unauthorized information transfer between virtual resources, for example, based at least in part on variation in request servicing time. In at least one embodiment, a customer may establish a barrier to such information transfer to other customers of the virtual facility provider 206 at least in part by requesting that the customer's virtual facilities be provisioned with dedicated implementation resources. Such barriers may lower a probability that one or more of the other customers of the virtual facility gains access to unpublished information concerning the customer's virtual facilities. Implementation resource dedication boundaries, defining implementation resource dedication units, may correspond to boundaries between physical and/or hardware components including boundaries due to physical barriers and/or physical separations, as well as to hard (e.g., hardware enforced) scheduling and/or timing boundaries, and suitable combinations thereof.

Figure 3:
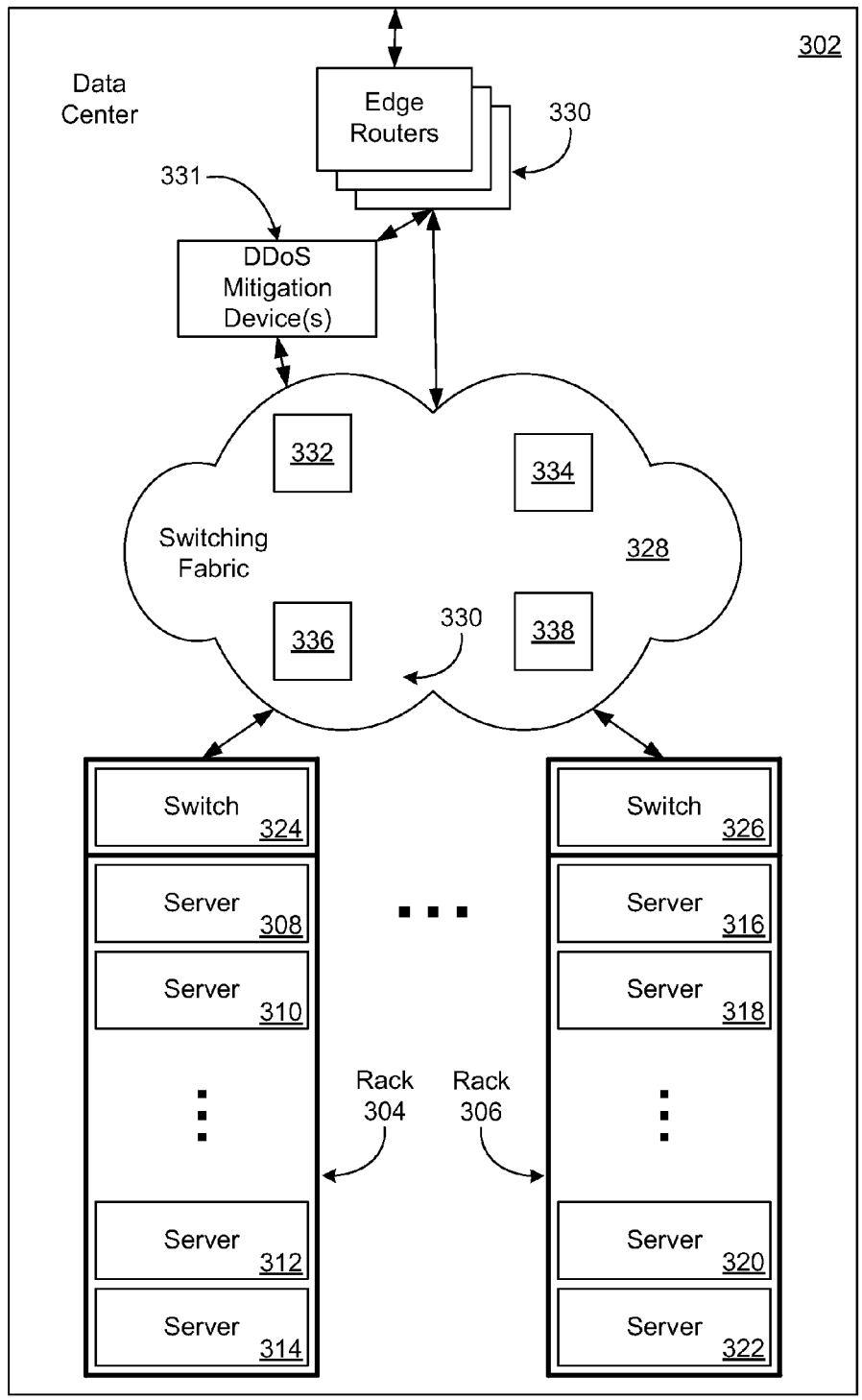
FIG. 3 is a schematic diagram depicting further aspects of the example data centers in accordance with at least one embodiment.

FIG. 3 depicts further aspects of data centers in accordance with at least one embodiment. A data center 302 may include multiple server racks 304-306. The data center 302 is an example of the data centers 402, 404 of FIG. 4. The ellipsis between the server rack 304 and the server rack 306 indicates that the data center 302 may include any suitable number of server racks although, for clarity, only two are shown in FIG. 3. Each server rack 304-306 may participate in maintaining services such as electric power and data communications to multiple server computers 308-314 and 316-322. Again, the ellipses indicate that the server racks 304-306 may include any suitable number of server computers. For example, the server computers 308-322 may include one or more VCS servers 222 (FIG. 2) and/or one or more data store servers 226. Each server 308-322 may correspond to an implementation resource dedication unit.

In FIG. 3, each server rack 304-306 is depicted as including a rack switch 324-326. The rack switches 324 and 326 may be responsible for switching packets of digital data to and from their respective sets of server computers 308-314 and 316-322. Each rack switch 324-326 may correspond to an implementation resource dedication unit. However, in the case (depicted in FIG. 3) that the server rack 304-306 includes one rack switch 324-326, dedicating the rack switch 324-326 to a particular customer of the virtual facility provider 206 (FIG. 2) causes dedication of the respective server rack 304-306. This is an example of dedication of a component (an implementation resource dedication sub-unit) of an implementation resource dedication unit causing dedication of the containing dedication unit ("containing unit dedication") in accordance with at least one embodiment. Implementation resources dedication units may indicate which (if any) of their sub-units cause containing unit dedication.

The rack switches 324-326 may be communicatively linked to a data center switching fabric 328 and then to a set of edge routers 330 that connects the data center 302 to one or more other computer networks including the Internet. The edge routers 330 may be configured to route some or all incoming network traffic to one or more DDoS mitigation devices 331. For example, if one or more Internet Protocol (IP) addresses are the target of a current DDoS attack, the edge routers 330 may be configured to route traffic directed to those IP addresses to the DDoS mitigation device 331. The DDoS mitigation device may be any device operable to analyze network traffic and/or information associated therewith and, based at least in part on the analysis, mitigate the network traffic by blocking or otherwise mitigating traffic potentially harmful traffic, such as traffic generated as part of a DDoS attack. Examples of such DDoS mitigation devices are available from Arbor Networks at 6 Omni Way, Chelmsford, Mass. 01824, such as Arbor Peakflow SP, Arbor Peakflow TMS, Arbor Peakflow X, and/or other devices available from Arbor Networks. Generally, the DDoS mitigation device may be any device or combination of devices operable to mitigate DDoS or other potentially harmful traffic. Further, while shown in the drawing as being between the edge routers 330 and the switching fabric, a DDoS mitigation device may be located in other places, such as any suitable location between an external network of the data center and a computing device that may potentially be the subject of a DDoS and/or other attack. Further, while shown as a separate device, other devices in the data center, functions of a DDoS mitigation device may be performed by other devices. For instance, one or more devices serving as an edge router may perform DDoS mitigation functions. Similarly, multiple devices in the data center may collectively perform one or more functions of the illustrated DDoS mitigation device.

The switching fabric may include any suitable set of networking components including multiple interconnected switches 332-338 (for clarity, only four are shown in FIG. 3) of one or more switch types arranged in one or more switching layers, as well as routers, gateways, bridges, hubs, repeaters, firewalls, computers, and suitable combinations thereof. In at least one embodiment, the rack switches 324-326 and the edge routers 330 are considered part of the switching fabric 328. The rack switches 324-326, the edge routers 330, and the components of the switching fabric 328 are examples of the network hardware 224 of FIG. 2.

Portions of the switching fabric 328, sets of switching fabric 328 networking components such as sets of the switches 332-338, and/or the edge routers 330 may correspond to implementation resource dedication units. Alternatively, or in addition, a particular customer of the virtual facility provider 206 (FIG. 2) may specify that the customer's virtual facilities be provisioned with a set of dedicated data paths and/or channels (collectively, "data paths") through the switching fabric 328 and/or the edge routers 330. With respect to dedicated data paths, the implementation resource dedication units may correspond to physical data paths such as sets of wires and/or cables. Alternatively, or in addition, the implementation resource dedication units may correspond to hard scheduled communication time slots in a synchronous communication scheme.

Figure 4:
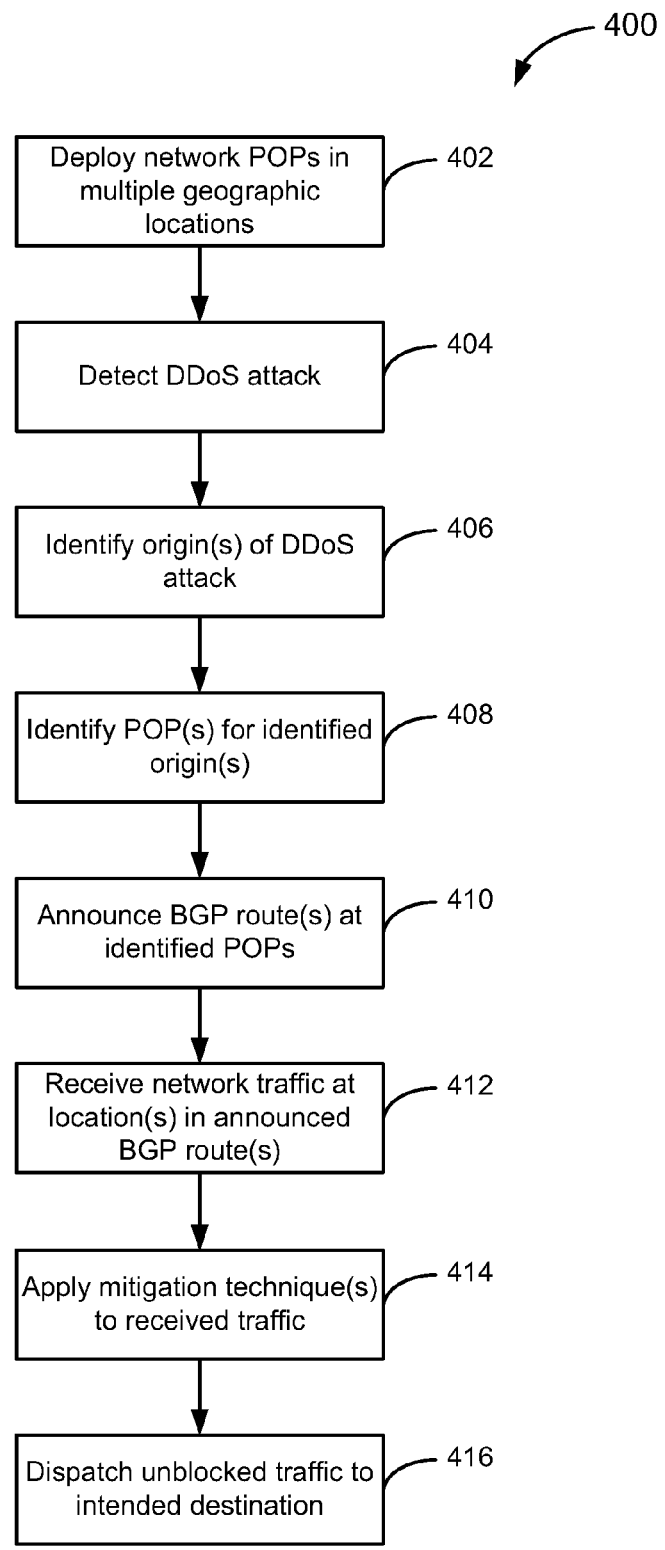
FIG. 4 is a flowchart for an illustrative example of a process for mitigating the effects of a DDoS attack in accordance with at least one embodiment.

FIG. 4 shows an illustrative example of a process 400 for responding to DDoS attacks in accordance with an embodiment. Some of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. In an embodiment, the process 400 includes deploying 402 network points of presence (POPs) in multiple geographic locations. The POPs may be located, for instance, in a plurality of geographical locations served by various Internet service providers (ISPs). The POPs may be, for example, collocated with data centers of various ISPs. As an example, a POP may be deployed to any geographic location from which DDoS attacks currently originate. While the present disclosure discusses, for the purpose of illustration, deployment of multiple POPs, various embodiments of the present disclosure may utilize a single deployed POP. In an embodiment, each POP is operable to announce border gateway protocol (BGP) routes onto the Internet in order to cause at least some network traffic to certain destinations to be routed through the POP. While the present disclosure discusses embodiments in terms of deploying POPs, other variations are possible. For example, POPs may already be deployed by ISPs or other entities. Various embodiments of the present disclosure may include cooperating with such entities to utilize the resources of such POPs.

In an embodiment, a DDoS attack is detected 404. Detection of the DDoS attack may be done in any suitable manner, such as using appropriate network analytics and/or receiving information indicative of a DDoS attack. For instance, a customer of a remote computing services provider may notify the remote computing services provider that one or more IP addresses served by the remote computing services provider on behalf of the customer are currently under a DDoS attack. In an embodiment, when the DDoS attack is detected, one or more geographic origins of the DDoS attack are identified 406. Identification of the DDoS attack origins may be performed in any suitable manner such as by analyzing source IP addresses of identified in IP packets, or in other ways such as described in more detail below.

Once the one or more origins of the DDoS attack are identified, one or more deployed POPs for the identified origins are identified 408. The one or more POPs may be for instance POPs that are closest in geographical proximity to a geographic region identified as an origin of the DDoS attack. For instance, if an origin of a DDoS attack is identified as being in a particular country, a POP may be identified as based at least in part on the POP being in that country or in geographical proximity to the country. If a country is served by multiple ISPs, multiple POPs, one for each ISP may be identified. The one or more POPs may also be identified based at least in part on proximity that is measured in other ways, such as proximity based at least in part on network topology and/or other network conditions. For instance, the one or more POPs may be identified as a function of one or more network conditions that include, but are not limited to, observed latency, hop count (network topology distance), available bandwidth, geographic distance, and political jurisdiction. The network conditions may be determined by measuring appropriate values for all or some network traffic directed to a victim of the detected DDoS attack, or in any suitable manner. In some embodiments, POPs may be located in exchanges where multiple carriers are available. Also, a geographic location served by multiple ISPs may have a single POP at an installation where low latency, relatively inexpensive bandwidth, and/or other advantages are available from one or more of the multiple ISPs. In instances where a geographic location (such as a country) is served by multiple ISPs, a POP may be identified for one, some, or all of the ISPs.

As a specific example, for some political jurisdictions, it may be desirable to identify a POP in the same political jurisdiction as an origin of at least a portion of network traffic that is being received. As another example, it may be desirable to identify one or more POPs that, upon routing network traffic through the POPs, will result in the lowest latency for the network traffic. In this latter example, if jurisdictional considerations do not dictate otherwise, a POP with the lowest latency for the corresponding network traffic may be identified. An identified POP may or may not be a POP that is geographically closest to a geographic origin of the detected DDoS attack. Generally, identification of the one or more POPs may be done in a manner that selects the POPs, based at least in part on the ability to redirect traffic of the DDoS attack through the identified POPs. Once the one or more POPs for the one or more identified origins are identified, in an embodiment, one or more border gateway protocol (BGP) routes are announced (advertised) 410 at the identified one or more POPs. Announcement of the routes may be done by BGP speakers of the POPs. The BGP speakers may advertise the routes in any manner that indicates to one or more appropriate ISPs to route traffic through the one or more POPs. In this manner, ISPs connected with the POPs may update routing tables to reflect preferred routes for the network traffic through the identified POPs or may otherwise reconfigure one or more systems so that at least a portion of the network traffic potentially related to the DDoS attack is routed through the one or more identified POPs.

Once the one or more BGP routes have been announced, network traffic at one or more locations in the announced BGP routes may be received 412. The network traffic may be received for instance at the POPs. However, the network traffic may be received at other locations, such as another location that is part of the announced BGP routes. By receiving network traffic, one or more mitigation techniques may be applied 414 to the received traffic. Packets for instance for the received traffic may be analyzed and packets may be blocked if analysis identified the packets as being part of the DDoS attack. Various techniques include, but are not limited to, use of a SYN proxy, source rate limiting, dynamic filtering using Access Control Lists, active verification using a SYN proxy while caching IP addresses determined to be legitimate, anomaly recognition such as transmission control protocol (TCP) state anomaly recognition, granular rate limiting, white lists, black lists, blocking traffic from dark IP addresses, other techniques, and combinations of techniques. Generally, any technique for identifying at least a portion of network traffic originating from a DoS may be used. Traffic that has not been blocked pursuant to the one or more mitigation techniques may be dispatched 416 toward the traffic's intended destination.

Figure 5:
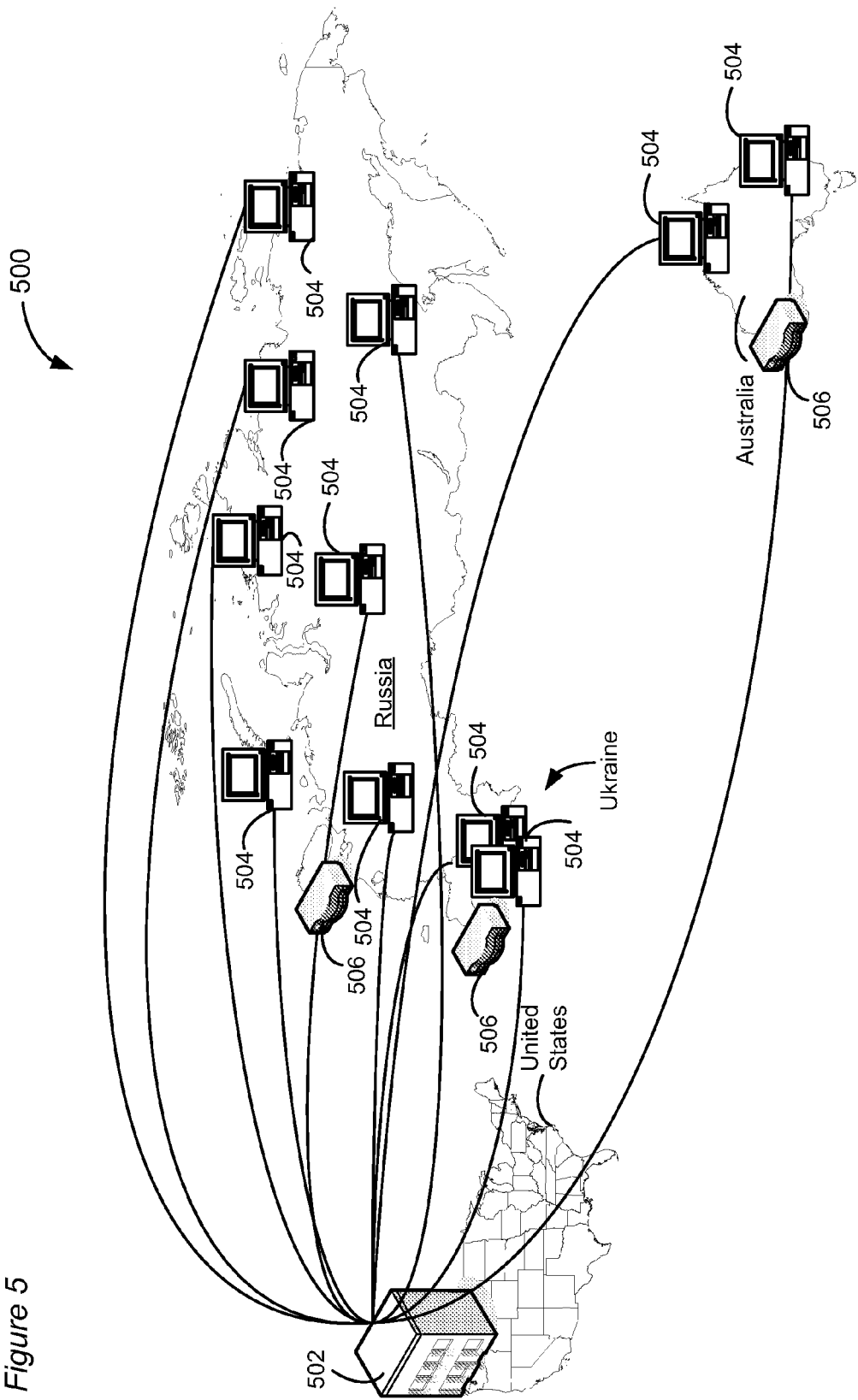
FIG. 5 is a schematic diagram illustrating a DDoS attack.
Figure 6:
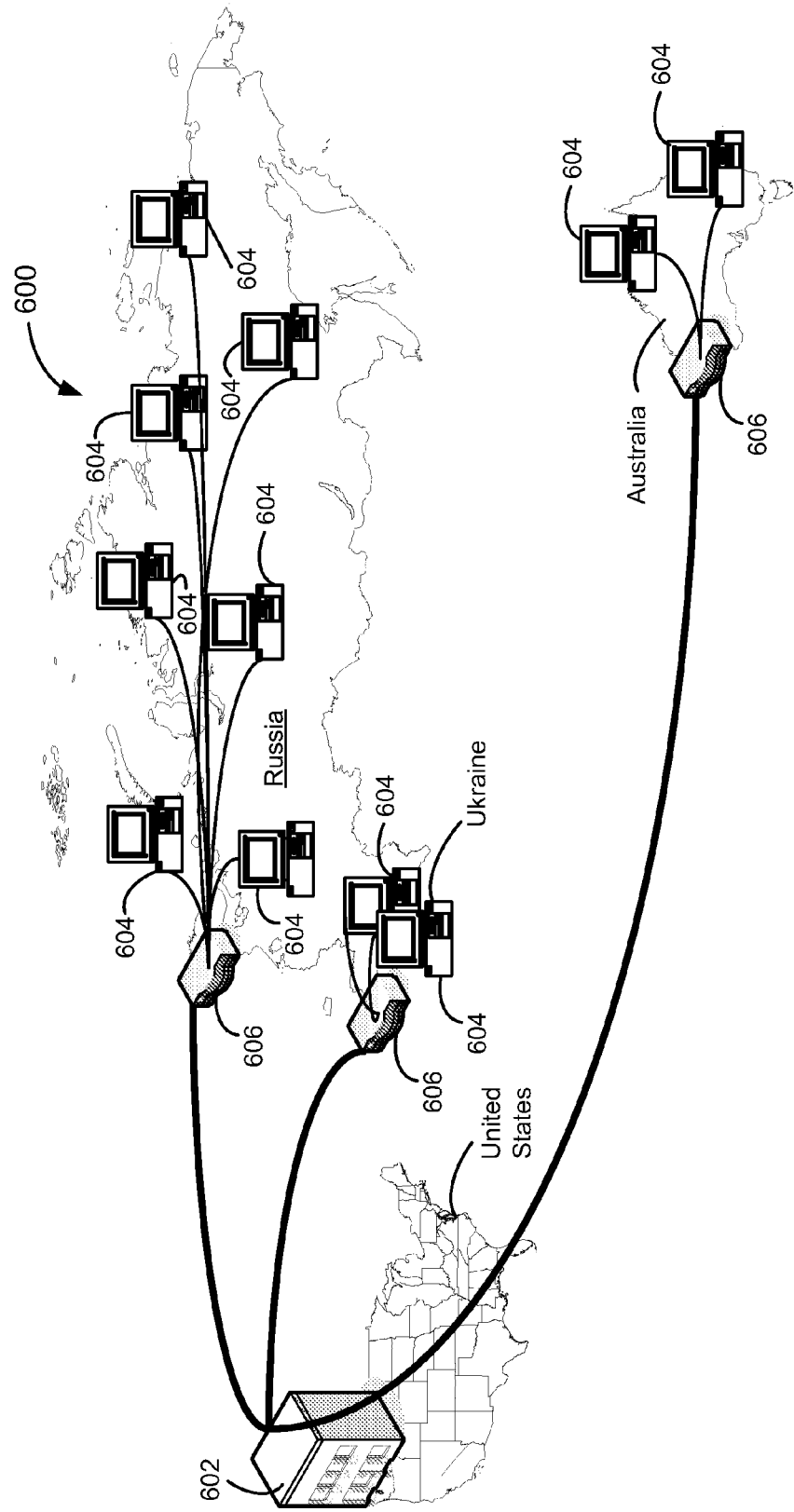
FIG. 6 is a schematic diagram illustrating the effect of employing various embodiments to mitigate the effects of a DDoS attack.

FIGS. 5 and 6 provide illustrative examples, respectively, of a DDoS attack and a result of performing the process 400, described above in a connection with FIG. 4. In particular, FIG. 5 shows a map 500 that includes representations of the United States, Russia, Ukraine, and Australia. As illustrated, the map 500 includes a data center 502 in the United States and traffic originating from a plurality of computing devices 504 distributed throughout various geographic locations, such as from various location in Russia, Ukraine, and Australia. In this particular example, one or more computing devices 504 may be sending traffic to an IP address (or a collection of IP addresses) serviced by the data center 502. Some of this traffic may be legitimate traffic while other portions of the traffic may be part of a DDoS attack. In this particular example, the data center 502 is located in the United States and the computing devices 504 are located throughout Australia, Russia and Ukraine. Of course, the particular countries depicted are just illustrative examples and DDoS attacks may originate from other places, including the same country as a victim of a DDoS attack. Further, while FIG. 5 shows various aspects of the disclosure in terms of various countries for the purpose of illustration, geographical regions from which portions of DDoS attacks originate do not necessarily correspond to political boundaries and/or may correspond or roughly correspond to other types of political boundaries, such as city boundaries, state boundaries, county boundaries, continental boundaries, and others.

As illustrated in FIG. 5, traffic that is sent to the data center 502 may reach the data center via various routes. These routes may cross multiple provider networks. For instance, network traffic originating in Russia may initially pass through communications channels (such as fiber optic cables) of a Russian ISP until entering channels of another ISP or other telecommunications carrier. Network traffic may pass through numerous regional and/or national ISPs and other telecommunications carriers before reaching its destination. For instance, at least some traffic originating from Russia may pass through equipment operated by at least one Russian company, at least one European companies, at least one transcontinental carrier, and at least one company in the United States. Various packets originating in one country may take various routs to the same destination.

In addition, as shown in FIG. 5, the map 500 also includes a plurality of remotely deployed POPs 506. In particular, in this illustrative example, one POP is located in each of Russia, Ukraine, and Australia. One or more of the POPs 506 may be physical locations that may include, but do not necessarily include, one or more servers, routers, asynchronous transfer mode (ATM) switches, and/or digital/analog call aggregators. Each of the physical locations may be part of facilities of a telecommunications provider that an entity associated with the data center 502 rents, leases, or otherwise uses, although the physical locations may be separate. One or more of the POPs may also be located at an Internet exchange point or collocation center. As shown in the figure, some of the traffic to the data center 502 may pass through one or more of the POPs as part of normal routing, although traffic need not pass through any of the POPs as part of normal routing.

As noted, FIG. 6 shows a map 600 which, in this example, is the map 500 discussed above. For instance, as with FIG. 5, the map 600 of FIG. 6 includes a data center 602 located in the United States and a plurality of computing devices 604 sending information to the data center 602. As shown, the computing devices are located throughout Australia, Russia, and Ukraine. In addition, the map 600 also includes a plurality of POPs 606, in this example one POP in each of Russia, Ukraine, and Australia. In an embodiment, once the DDoS attack has been detected, each of the POPs illustrated in the figure may advertise one or more BGP routes through the POPs, thereby causing associated ISPs to route traffic to the data center 602 through the POPs. The POPs 606 then receive much of the traffic from the computing devices 604, filter that traffic as described above, and pass on unfiltered traffic to the data center 602. The unfiltered traffic may be sent over a private VPN or dark fiber network, although the traffic may be sent over other channels, such as one or more others' VPN or dark fiber network. In this manner, much of the traffic involved in a DDoS attack is blocked at a location that is close to the source or sources of the attack.

As noted, FIGS. 5 and 6 collectively illustrate a DDoS attack and an embodiment for mitigating the effects of the DDoS attack. However, variations of the process described above are considered as being within the scope of the present disclosure. For instance, the POPs may announce BGP routes for one or more IP addresses (perhaps for several customers of the data center) prior to detection of a DDoS attack. In this manner, a substantial amount of traffic to the data center originating in Russia, Ukraine, and/or Australia may pass through the POPs at most times. Network traffic flowing through the POPs may be filtered at all times or, in order to conserve computing resources, upon detection of DoS attacks. Other variations, including some discussed below, are also within the scope of the present disclosure.

Figure 7:
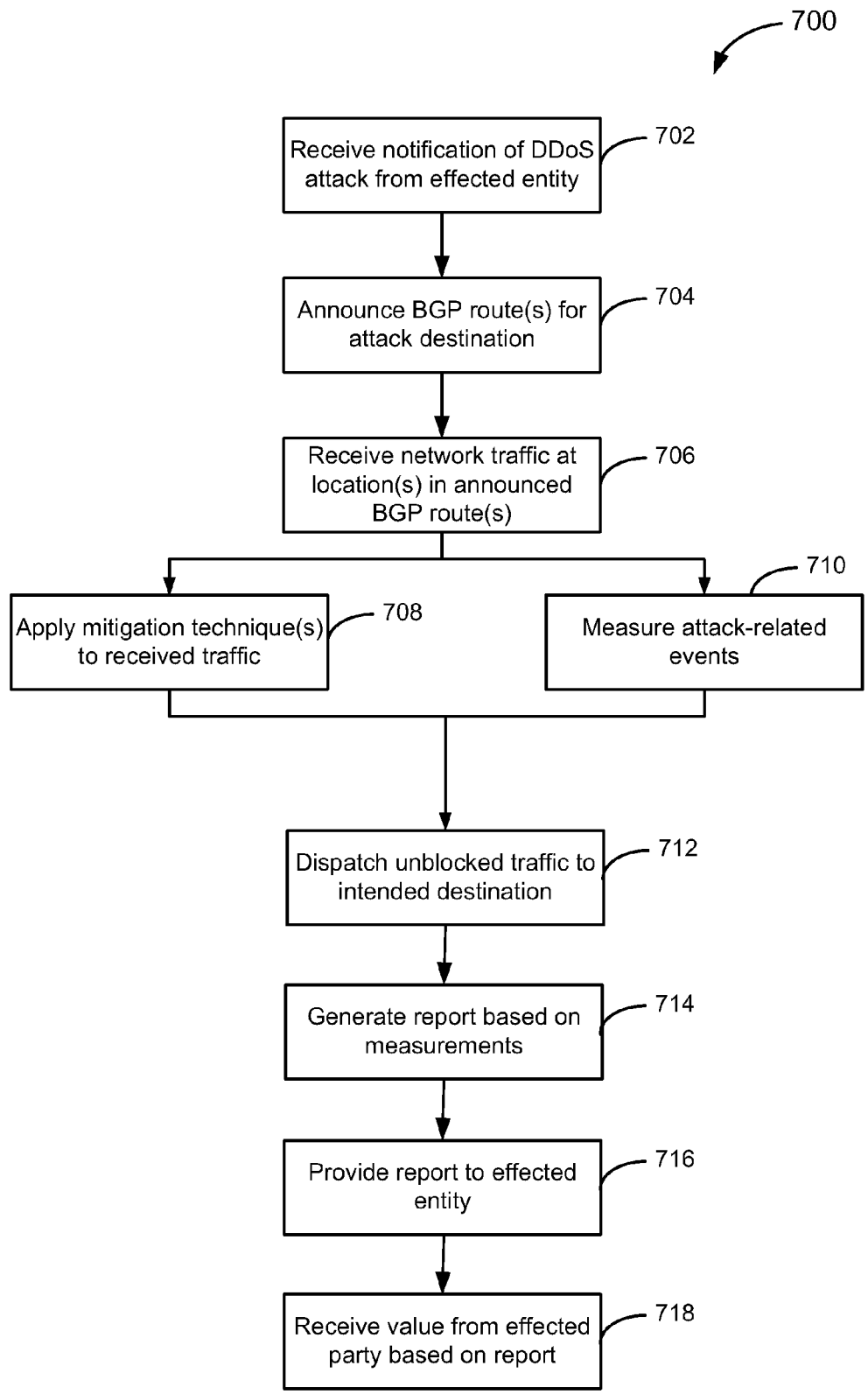
FIG. 7 a flowchart for an illustrative example of a process for providing DDoS mitigation techniques as a service in accordance with at least one embodiment.

As noted, various embodiments of the present disclosure may be used to provide DDoS mitigation service as a service to one or more customers. For instance, referring to FIGS. 5 and 6, the customers may be users of a remote computing services provider that operates the data center. However, customers may be other customers, such as entities that utilize other data centers and/or their own data centers. Customers may also be ISPs, telecommunications carriers, or other entities that facilitate the passage of network traffic over various networks. Accordingly, FIG. 7 illustrates an example process 700 for providing DDoS mitigation services to such customers, in accordance with an embodiment. The process 700, in this example, includes receiving 702 a notification of a DDoS attack. For instance, an organization (such as a customer of a computing services provider) finding itself under a DDoS attack may order DDoS mitigation services and notification may be received as part of the ordering process. As another example, the notification may be received from a system, which may be a third party system, that detects DDoS attacks. Generally, any way of becoming informed of a DDoS attack may be used.

In an embodiment, upon receiving notification (or otherwise obtaining knowledge of the existence of a DDoS attack) one or more BGP routes are announced 704 for the attack destination (victim). Announcement of the one or more BGP routes may be performed for instance in accordance with the above description. BGP routes may, for example, be announced for one or more IP addresses corresponding to the destination. BGP routes may also be announced for an IP address space, which may be the smallest IP address space, that contains a set of one or more IP addresses of the destination of the attack. As noted above, announcement of the one or more BGP routes may cause network traffic to be received 706 at one or more locations at the announced one or more BGP routes. Network traffic may be received, for example, at one or more remotely-deployed POPs, such as discussed above. One or more mitigation techniques (strategies) may be applied 708 to the received network traffic such as in a manner described above.

Concurrently with application of the mitigation techniques, or another suitable time, one or more attack-related measurements may be taken 710. The attack-related measurements may be measurements of any aspect of a DDoS mitigation service being provided to the affected entity. For instance, the measurements may be measurements of the amount of traffic directed to the DDoS victim that has been received. As an alternative or an addition, measurements may be made of the amount of traffic that is blocked from its intended destination. Other possible measurements that may be used include, but are not limited to, the amount of time any DDoS mitigation strategies are applied, a number of IP addresses being the subject of a DDoS attack, and/or generally any aspect of a DDoS mitigation service. Generally, anything that indicates performance of a DDoS mitigation service on behalf of the victim may be measured.

In an embodiment, the traffic that has been received but not blocked is dispatched 712 toward its intended destination, such as in the manner described above. In addition, one or more reports may be generated 714, based at least in part on the measurements that were taken. A report generated in accordance with the present description may be, for example, an invoice that summarizes DDoS mitigation actions taken on behalf of the customer. Accordingly, a generated report, in an embodiment, is provided 716 to the affected entity, and value from the affected entity may be received 718 based at least in part on the report. For instance, the report may state an amount of money to be remitted and the value may be that much money or another amount.

Figure 8:
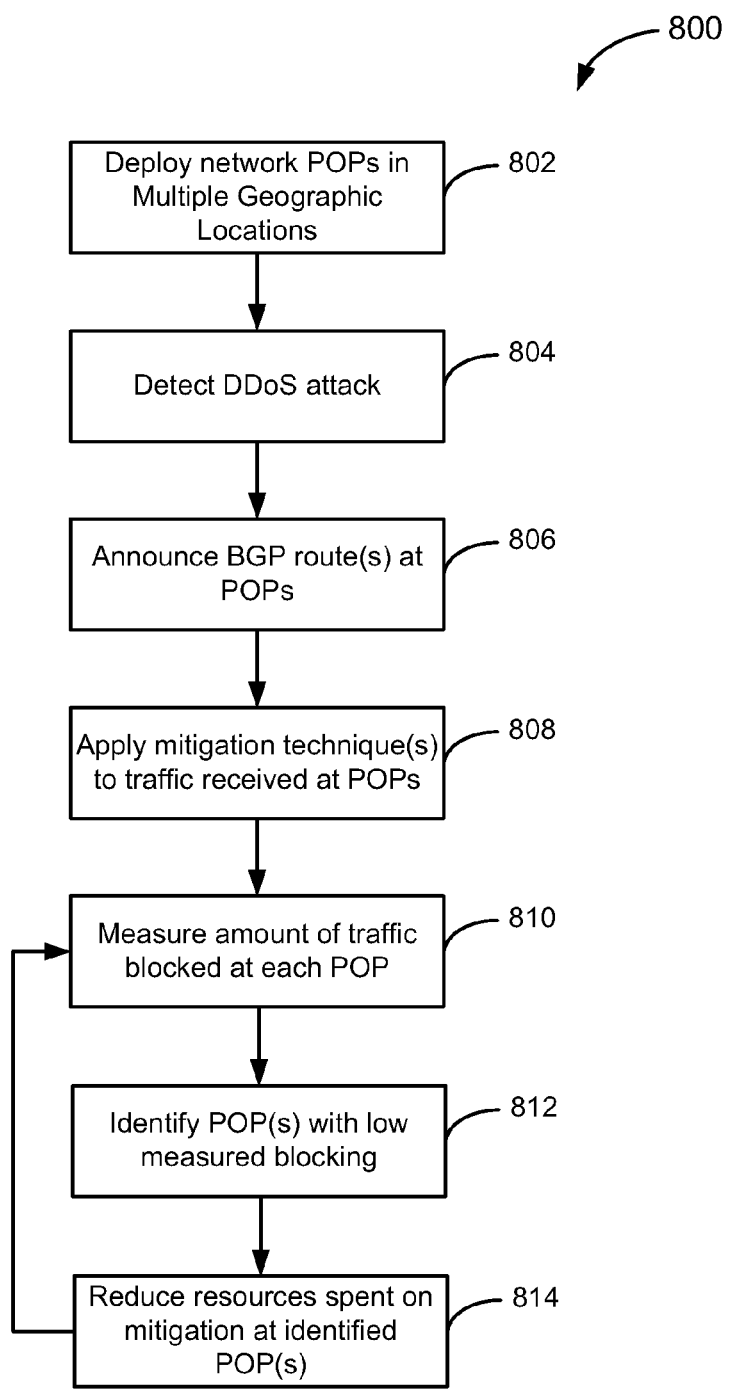
FIG. 8 a flowchart for an illustrative example of a process for mitigating the effects of a DDoS attack in accordance with at least one embodiment.

As noted, various embodiments of the present disclosure operate in different ways. For instance, the process 400 discussed above in connection with FIG. 4 includes detecting a DDoS attack and announcing BGP routes for POPs identified as being geographically proximate to one or more source regions of the attack. FIG. 8 shows a flowchart for an illustrative example of a variation of this process. In particular, FIG. 8 shows an illustrative example of a process 800 which may be used for DDoS mitigation in accordance with an embodiment. Aspects of a process 800 may be similar to those described above in connection with the process 400 described above in connection with FIG. 4. For instance, in an embodiment, network POPs are deployed 802 in multiple geographic locations, such as in the manner described above. Similarly, a DDoS attack may be detected 804. In addition, one or more BGP routes are announced by the POPs, in accordance with an embodiment. In an embodiment, BGP routes are announced for all deployed POPs, although BGP routes may be announced for less than all deployed POPs Announcement of the BGP routes may be performed independently of any determination of any geographic origins of the DDoS attack.

As discussed above, announcement of the BGP routes at the POPs may cause at least some of the traffic in connection with the DDoS attack to be routed through one or more locations of the announced BGP routes, such as at the POPs themselves. Accordingly, one or more mitigation techniques may be applied 808 to traffic received at the POPs. Mitigation techniques for example may be those techniques in accordance with the above description. In an embodiment, the amount of traffic blocked at each POP is measured 810 for each of the POPs. For instance, a number of IP packets blocked as a result of application of the DDoS mitigation techniques may be counted. Generally, any suitable manner for measuring computing resources spent mitigating a DDoS attack or measuring anything indicative of such resource expenditure may be used.

In an embodiment, one or more POPs with low measured blocking are identified 812 and resources spent on mitigation of the identified POPs is reduced 814 in accordance with an embodiment. For example, IP packets received may be allowed to pass to their destination without being analyzed and potentially blocked. As an alternative or in addition, announced BGP routes may be updated to reduce, possibly completely reduce, the amount of network traffic to the DDoS victim that is received by a remotely deployed POP and filtered by the POP. Alternatively, the POP may cease communication with an ISP for at least network traffic directed to the DDoS victim in order to force the ISP to update its routing tables to exclude the POP. As yet another alternative, faster but less effective DDoS mitigation techniques may be used instead of more thorough and resource-intensive techniques. Generally, any suitable method of reducing the resources spent on DDoS mitigation may be used.

As illustrated, the amount of traffic blocked at each POP (or other suitable indicator) may be measured repeatedly and used to identify POPs that are not blocking a significant amount of traffic and reduce resources spent on DDoS mitigation accordingly. In this manner, computing resources spent on DDoS mitigation is continually monitored and resource expenditure is adjusted accordingly. In addition, should a DDoS attack cease, resource expenditure on DDoS mitigation for the victim may cease as well as the amount of traffic blocked decreases and the amount of resources spent on DDoS mitigation decreases accordingly.

As with all processes described herein, variations are considered as being within the scope of the present disclosure. For instance, the process 800 depicted in FIG. 8 may also include monitoring to determine whether to announce BGP routes in accordance with changes in the origin of a DDoS attack over time. In addition, as noted, the BGP routes may be announced prior to detection or otherwise obtaining knowledge of the existence of a DDoS attack. In this instance, the amount of resources spent on DDoS mitigation may be adjusted as necessary while a significant portion of the network traffic still would flow through the remotely deployed POPs.

As noted, embodiments of the present disclosure provide numerous advantages over conventional techniques for mitigating the effects of DDoS attacks and similar network conditions. For example, one manner of reacting to a DDoS attack involves changing the IP address (or multiple addresses of a collection of locations) of a network destination under attack so that the DDoS-related traffic is sent to an old IP address while the new IP address may be used for legitimate purposes. However, updating IP addresses to avoid a DDoS attack may include updating a Domain Name System (DNS) configuration so that legitimate traffic may be routed to the updated IP addresses. When a DNS configuration is updated, however, the DDoS attack may be reconfigured to attack the new IP address. Other conventional techniques may involve updating IP addresses and reconfiguring network equipment so that legitimate traffic is routed through a third party and traffic destined to the original IP address that does not originate from the third party is not allowed to reach the original IP address. Such techniques may be intrusive to the victim since they may require reconfiguring a DNS configuration (and waiting for such configuration changes to propagate). Various embodiments of the present disclosure, however, do not require victims of a DDoS attack to update IP addresses since the network traffic attributable to a DDoS attack is substantially reduced and possibly eliminated. Thus, victims (such as customers of a computing service provider that employs one or more techniques described herein) of a DDoS attack are able to attain protection with less disruption and inconvenience.

Figure 9:
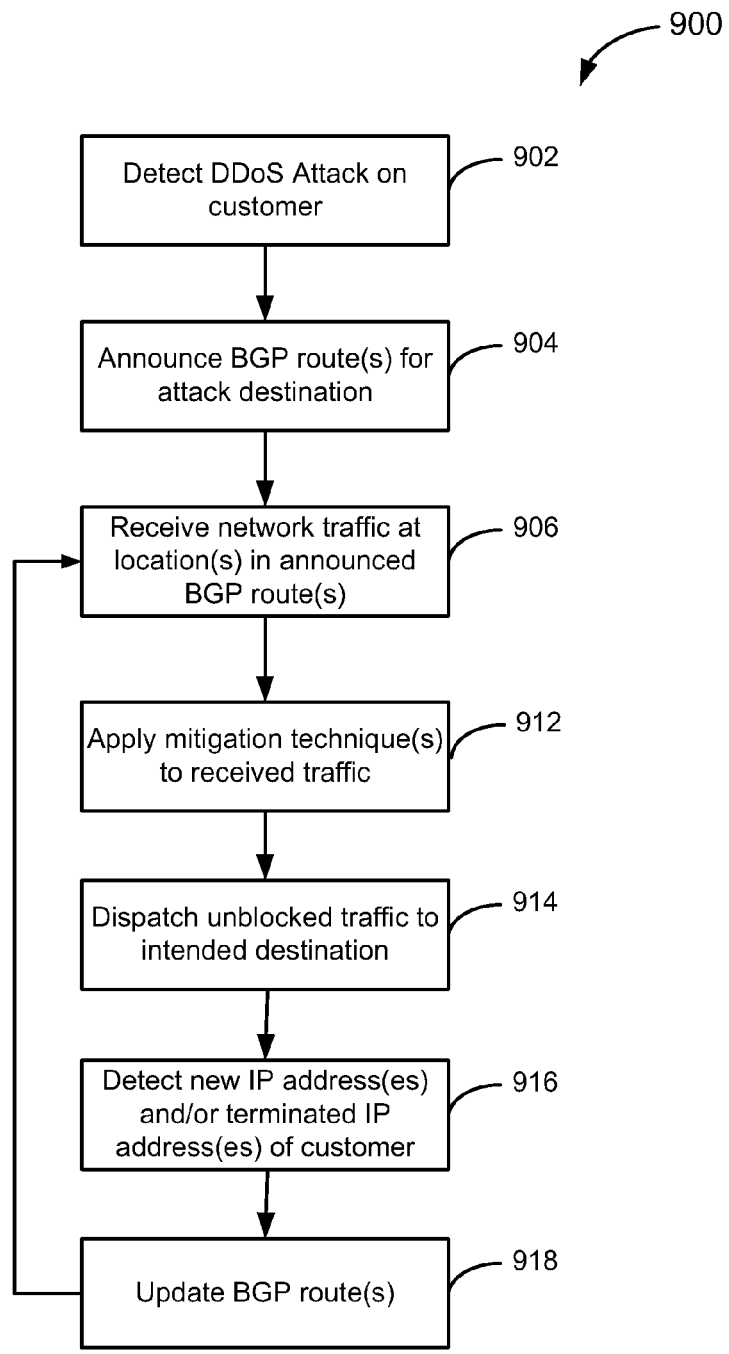
FIG. 9 a flowchart for an illustrative example of a process for protecting a victim of a DDoS attack in accordance with at least one embodiment.

As noted, while not necessary in various embodiments, victims of a DDoS attack may, as an additional strategy, attempt to avoid harmful effects of a DDoS attack by changing one or more IP addresses under which they operate. For instance, if an organization is a victim of a DDoS attack for a group of one or more IP addresses, the organization may reconfigure its servers to operate using one or more different IP addresses. Upon reconfiguration, the new IP addresses may be updated in one or more domain name system (DNS) servers in order to notify users of the new addresses. However, the DDoS attack may also adapt in order to attack the newly announced IP addresses as DNS information is refreshed or the new network locations are otherwise found. Accordingly, FIG. 9 illustrates a process 900 for mitigating the effects of a DDoS attack for victims who utilize such attack avoidance techniques.

As illustrated herein, the process 900 is illustrated in connection with a DDoS attack detected 902 on a customer, such as a customer of a remote computing services provider. However, variations of the process 900 may be utilized in accordance with any victim of a DDoS attack. In an embodiment, when a DDoS attack is detected, one or more BGP routes for the attack destination are announced 904 such as in the manner described above. As described above with the BGP routes for the attack destination announced, network traffic may be received 906 at locations in the announced BGP routes. Network traffic may be received for instance at a POP which has been deployed in accordance with the various embodiments described herein. In addition, one or more mitigation techniques may be applied 912 to the received traffic and unblocked traffic may be dispatched 914 to its intended destination.

In an embodiment, one or more new IP addresses and/or terminated IP addresses of the customer are detected 916. For example, in accordance with an embodiment employing a system such as the system described above in connection with FIG. 2, the virtual resource provider 206 may detect through its control plane 210 events corresponding to one or more clients 204 ordering new IP address and/or terminating existing IP addresses. In an embodiment, upon detection of the new and/or terminated IP addresses, the one or more BGP routes are updated 918 in order to cause network traffic of the DDoS attack to be routed in a manner such that one or more DDoS mitigation techniques may be applied to that traffic such as in the manner described above. In this manner, as the customer or other organization updates IP addresses, BGP routes may be updated accordingly such that the effects of the DDoS attack are nearly constantly mitigated. Importantly, protection from a DoS attack is put in place before the attacker(s) is able to discover the new IP addresses of the victim.

Figure 10:
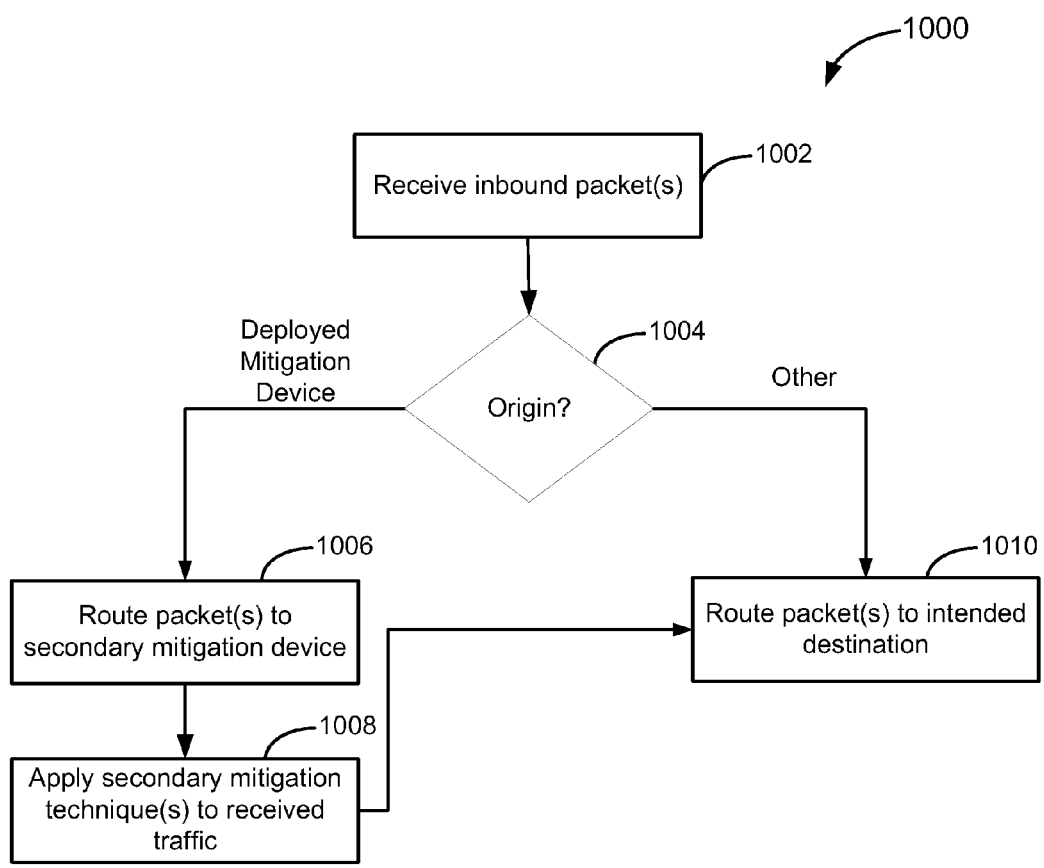
FIG. 10 a flowchart for an illustrative example of a process for further mitigating the effects of a DDoS attack in accordance with at least one embodiment.

As noted above, a data center or other location to which traffic is ultimately destined may utilize one or more DDoS mitigation devices such as described above in connection with FIG. 3. However, DDoS mitigation devices are often expensive and therefore, in order to receive the most value, it may be desired to selectively use DDoS mitigation devices by selectively routing traffic through the DDoS mitigation devices. Accordingly, FIG. 10 illustrates a process 1000 for selectively utilizing DoS mitigation resources. In an embodiment, performance of the process 1000 is performed at a data center hosting one or more devices associated with one or more IP addresses of a system that is subject of DDoS attack. In an embodiment, an inbound packet is received 1002. While the illustrative example of FIG. 10 discusses embodiments of the disclosure in terms of packets, the process 1000 may be adapted for use with other types of traffic, including non-packet-based traffic. For example, the process 1000 may be adapted to receive and analyze other units of information traveling over a network, such as flows, where a flow is a sequence of related packets. In the particular embodiment illustrated in FIG. 10, when the inbound packet is received 1002, a determination is made 1004 of the packet's origin. In an embodiment, a determination is made whether the origin is a deployed mitigation device (such as a device in a remotely deployed POP in accordance with the above description) or another origin. The deployed mitigation device may be, for example, a device which provides a level of network filtering that is more coarse than another mitigation device at the data center, such as an Arbor product described above. In an embodiment, if it is determined that the origin of the packet is a deployed mitigation device, the packet is routed to a secondary mitigation device such as a DDoS mitigation discussed above in connection with FIG. 3. The secondary mitigation device may be, for example, an Arbor or other product and may filter network traffic more finely than the deployed mitigation device.

One or more secondary mitigation techniques may be applied 1008 to the received packet in accordance with an embodiment, for instance, one or more techniques utilized by the solutions provided by Arbor Networks discussed above. Upon application of any mitigation techniques to the received packet, if the packet is not filtered by the applied secondary mitigation techniques, the unfiltered packet is routed 1010 to its intended destination such as an IP address of a device hosted in the data center that received the inbound packet. In this manner, easier-to-detect network traffic connected with a DDoS attack is stopped near the source while more-difficult-to-detect DDoS traffic may be blocked at a more central location. Thus, cheaper equipment may be remotely deployed to a number of remote locations while more expensive equipment may be deployed in more central locations, thereby allowing the more expensive equipment to be able to be used to protect a greater number of network destinations than if the remote mitigation devices had not been deployed and used. As packets are received 1002, the process 100 may be repeated in order to ensure that traffic that is more likely to be part of the DDoS attack is analyzed and, if necessary, filtered, whereas other traffic, which is less likely to be part of a DDoS attack, is routed directly to its intended destination.

As discussed, variations of the above description are considered as being within the scope of the present disclosure. For instance, while the above illustrative examples illustrate various embodiments in connection with DDoS attacks, many techniques described and suggested herein are similarly applicable to other types of attacks. For instance, many of the above techniques are applicable to other types of DoS attacks and not just DDoS attacks. Other variations will be appreciated by those with ordinary skill in the art.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving information indicative of a distributed denial of service attack on a victim;
    identifying one or more network conditions in connection with the distributed denial of service attack including determining one or more values for one or more members of the group consisting of: geographic distance and political jurisdiction;
    selecting, based at least in part on the identified one or more network conditions, one or more remotely deployed network points of presence of a plurality of remotely deployed network points of presence, the one or more remotely deployed network points of presence being geographically local to an attack origin of the distributed denial of service attack, the one or more remotely deployed network points of presence individually including a device that participates in a private channel communicatively coupled with the victim and that is located at a geographically remote location with respect to the victim;
    taking one or more actions that modify an addressing route for one or more internet protocol addresses of the victim to cause the one or more remotely deployed network points of presence to each receive at least a portion of redirected network traffic addressed to the victim;
    sending, to one or more remotely deployed network points of presence, instructions that cause the one or more remotely deployed network points of presence to each, at least:

perform a first set of denial of service mitigation techniques on the at least a portion of the received network traffic addressed to the victim;

block, based at least in part on the first set of denial of service mitigation techniques, the portion of the received network traffic addressed to the victim, at least a portion of the received network traffic attributable to the distributed denial of service attack; and dispatch, utilizing the private channel, a first unblocked portion of the received network traffic toward a mitigation device responsible for performing a second set of denial of service mitigation techniques;

receiving, by the mitigation device, the first unblocked portion of the received network traffic addressed to the victim, which causes the mitigation device to, at least;

identify, based on the utilization of the private channel, that the first unblocked portion of the received network traffic has been received by the one or more remotely deployed network points of presence;

perform the second set of denial of service mitigation techniques on the first unblocked portion of the received network traffic addressed to the victim, the second set of denial of service mitigation techniques providing a finer level of network filtering that blocks a portion of the received network traffic that was not blocked by the first set of denial of service mitigation techniques;

block, based at least in part on the performed second set of denial of service mitigation techniques, at least a portion of the received network traffic attributable to the distributed denial of service attack; and dispatch, to the victim, a second unblocked portion of the received network traffic addressed to the victim.

2. The computer-implemented method of claim 1, further comprising:

selecting, based at least in part on the identified one or more network conditions, the one or more remotely deployed network points of presence from a set of remotely deployed network points of presence to be a receiver of at least a portion of network traffic addressed to the victim.

3. The computer-implemented method of claim 1, wherein the one or more actions exclude changing a destination network address of the victim.

4. The computer-implemented method of claim 1, wherein receiving the information indicative of the distributed denial of service attack on the victim includes receiving a request, from the victim, for protection from the distributed denial of service attack.

5. The computer-implemented method of claim 1, wherein the one or more remotely deployed network points of presence being geographically local to the attack origin causes a reduction in attack traffic.

6. The computer-implemented method of claim 1, wherein taking the one or more actions that cause the one or more remotely deployed network points of presence to each receive at least the portion of redirected network traffic addressed to the victim comprises sending, to the one or more remotely deployed network points of presence, instructions that cause the one or more remotely deployed network points of presence to each cause redirection of the network traffic addressed to the victim.

7. The computer-implemented method of claim 1, wherein taking the one or more actions that cause the one or more remotely deployed network points of presence to each receive at least the portion of redirected network traffic addressed to the victim occurs responsive to receiving the information indicative of the distributed denial of service attack on the victim.

8. The computer-implemented method of claim 1, wherein performing the first set of denial of service mitigation techniques reduces traffic dispatched to the mitigation device.

9. The computer-implemented method of claim 1, further comprising:

measuring the amount of blocked traffic at each remotely deployed network point of presence;

determining a remedial action based at least in part on the measuring; and executing the determined remedial action.

10. The computer-implemented method of claim 9, wherein the remedial action includes to update an addressing route for one or more internet protocol addresses of the victim to cause a different remotely deployed network point of presence to receive the portion of redirected network traffic.

11. A computer-implemented method, comprising:

receiving, from one or more network destinations, information indicative of a distributed denial of service attack;

identifying one or more network conditions in connection with the distributed denial of service attack including determining one or more values for one or more members of the group consisting of: geographic distance and political jurisdiction;

selecting, based at least in part on the identified one or more network conditions, one or more remotely deployed network points of presence of a plurality of remotely deployed network points of presence, the one or more remotely deployed network points of presence being geographically local to an attack origin of the distributed denial of service attack, the one or more remotely deployed network points of presence individually including one or more devices that each participate in a private channel communicatively coupled with the one or more network destinations, the one or more devices located at a geographically remote location with respect to the one or more network destinations;

taking one or more actions that cause a modification of an addressing route for one or more internet protocol addresses of the one or more network destinations, the one or more actions causing at least one remote network service provider to route at least a portion of network traffic addressed to the one or more network destinations through the one or more remotely deployed network points of presence at the geographically remote location;

at least during network conditions indicative of a denial of service attack on the one or more network destinations, causing one or more devices at the one or more remotely deployed network points of presence to perform a first set of denial of service mitigation techniques on the at least a portion of the received network traffic addressed to the one or more network destinations prior to dispatching the network traffic filtered with the first set of denial of service mitigation techniques toward the one or more network destinations using the private channel, the network traffic filtered with the first set of denial of service mitigation techniques excluding network traffic addressed to the one or more network destinations determined to be illegitimate; and performing a second set of denial of service mitigation techniques on the initially filtered network traffic based on identifying that the initially filtered network traffic was received using the private channel, the second set of denial of service mitigation techniques providing a finer level of network filtering that blocks a portion of the received network traffic that was not blocked by the first set of denial of service mitigation techniques, prior to dispatching the network traffic filtered with the second set of denial of service mitigation techniques toward the one or more network destinations, the network traffic filtered with the second set of denial of service mitigation techniques excluding network traffic addressed to the one or more network destinations determined to be illegitimate.

12. The computer-implemented method of claim 11, wherein taking the one or more actions that modify the addressing route for the one or more internet protocol addresses of the one or more network destinations is in response to receiving the information indicative of a distributed denial of service attack.

13. The computer-implemented method of claim 11, wherein causing the one or more devices to filter, with the first set of denial of service mitigation techniques, the network traffic includes causing the one or more devices to route the filtered network traffic over the private channel, the private channel being associated with the one or more devices and the one or more network destinations.

14. The computer-implemented method of claim 11, further comprising detecting one or more new network addresses of the one or more network destinations.

15. The computer-implemented method of claim 14, wherein the one or more new network addresses for the one or more network destinations are provisioned by the one or more devices on behalf of a customer of a computing services provider, and wherein the one or more devices are operated by the computing services provider.

16. The computer-implemented method of claim 14, wherein the one or more devices includes a control environment, wherein the one or more new network addresses are provisioned using the control environment, and wherein detecting the one or more new network addresses is performed in the control environment.

17. The computer-implemented method of claim 11, wherein the one or more network destinations are in a first country and wherein the geographically remote location is in a second country that is different from the first country.

18. The computer-implemented method of claim 11, wherein the one or more network destinations correspond to one or more destination network addresses and wherein the one or more actions exclude changing the one or more destination network addresses.

19. A computer system for protecting against denial of service attacks, comprising:
one or more processors; and
memory including executable instructions that, when executed by the one or more processors, cause the computer system to at least:
receive information indicative of a distributed denial of service attack on a victim;
identify one or more network conditions in connection with the distributed denial of service attack including determining one or more values for one or more members of the group consisting of: geographic distance and political jurisdiction;
select, based at least in part on the identified one or more network conditions, a remotely deployed network point of presence of a plurality of remotely deployed network points of presence, the remotely deployed network point of presence being geographically local to an attack origin of the distributed denial of service attack, the remotely deployed network point of presence including a device that participates in a private channel communicatively coupled with the victim and that is located at a geographically remote location with respect to the victim;
take one or more actions that update an addressing route for an internet protocol address of the victim, the updating causing at least one remote network service provider to route at least a portion of network traffic addressed to one or more network destinations through the remotely deployed network point of presence at the geographically remote location;
at least during network conditions indicative of a denial of service attack on the one or more network destinations, cause one or more devices at the geographically remote location to perform a first set of denial of service mitigation techniques on the at least a portion of the received network traffic addressed to the one or more network destinations prior to dispatching the network traffic filtered with the first set of denial of service mitigation techniques toward the one or more network destinations using the private channel, the network traffic filtered with the first set of denial of service mitigation techniques excluding network traffic addressed to the one or more network destinations determined to be illegitimate; and
perform a second set of denial of service mitigation techniques on the initially filtered network traffic based on identifying that the initially filtered network traffic was received using the private channel, the second set of denial of service mitigation techniques providing a finer level of network filtering that blocks a portion of the received network traffic that was not blocked by the first set of denial of service mitigation techniques, prior to dispatching the network traffic filtered with the second set of denial of service mitigation techniques toward the one or more network destinations, the network traffic filtered with the second set of denial of service mitigation techniques excluding network traffic addressed to the one or more network destinations determined to be illegitimate.

20. The computer system of claim 19, wherein taking the one or more actions is in response to the indication of the denial of service attack.

21. The computer system of claim 19, wherein causing the one or more devices to filter, with the first set of denial of service mitigation techniques, network traffic includes causing the one or more devices to route the network traffic filtered with the first set of denial of service mitigation techniques over a private channel.

22. The computer system of claim 19, wherein the executable instructions further cause the computer system to detect the updated addressing route.

23. One or more computer-readable storage media having stored thereon instructions executable by one or more processors of a computer system that, when executed by the one or more processors, cause the computer system to at least:
receive, from one or more network destinations, information indicative of a distributed denial of service attack;
identify one or more network conditions in connection with the distributed denial of service attack including determining one or more values for one or more members of the group consisting of: geographic distance and political jurisdiction;
select, based at least in part on the identified one or more network conditions, one or more remotely deployed network points of presence of a plurality of remotely deployed network points of presence, the one or more remotely deployed network points of presence being geographically local to an attack origin of the distributed denial of service attack, the one or more remotely deployed network points of presence individually including one or more devices that each participate in a private channel communicatively coupled with the one or more network destinations, the one or more devices located at a geographically remote location with respect to the one or more network destinations;

take one or more actions that cause a modification of an addressing route for one or more internet protocol addresses of the one or more network destinations, the one or more actions causing at least one remote network service provider to route at least a portion of network traffic addressed to the one or more network destinations through the one or more remotely deployed network points of presence at the geographically remote location;

at least during network conditions indicative of a denial of service attack on the one or more network destinations, cause one or more devices at the one or more remotely deployed network points of presence to perform a first set of denial of service mitigation techniques on the at least a portion of the received network traffic addressed to the one or more network destinations prior to dispatching the network traffic filtered with the first set of denial of service mitigation techniques toward the one or more network destinations using the private channel, the network traffic filtered with the first set of denial of service mitigation techniques excluding network traffic addressed to the one or more network destinations determined to be illegitimate; and perform a second set of denial of service mitigation techniques on the initially filtered network traffic based on identifying that the initially filtered network traffic was received using the private channel, the second set of denial of service mitigation techniques providing a finer level of network filtering that blocks a portion of the received network traffic that was not blocked by the first set of denial of service mitigation techniques, prior to dispatching the network traffic filtered with the second set of denial of service mitigation techniques toward the one or more network destinations, the network traffic filtered with the second set of denial of service mitigation techniques excluding network traffic addressed to the one or more network destinations determined to be illegitimate.

24. The one or more computer-readable storage media of claim 23, wherein the one or more network destinations each correspond to a virtual machine instance.

25. The one or more computer-readable storage media of claim 23, wherein the executable instructions further comprise instructions that cause the computer system to at least:
 detect changes in a set of one or more network addresses for the one or more network destinations; and
 causing an update of one or more BGP routes according to the detected changes.

* * * * *